United States Patent

Sakamoto et al.

[11] Patent Number: 6,044,742
[45] Date of Patent: Apr. 4, 2000

[54] DIE HOLDER MOUNTING STRUCTURE

[75] Inventors: Hiroichi Sakamoto; Kenichi Marui, both of Kagamigahara, Japan

[73] Assignee: Murata Kikai Kabushiki Kaisha, Kyoto, Japan

[21] Appl. No.: 08/826,379

[22] Filed: Apr. 9, 1997

[30] Foreign Application Priority Data

Apr. 11, 1996 [JP] Japan .................................. 8-115541

[51] Int. Cl.[7] ................................ B26D 7/26; B26D 5/08
[52] U.S. Cl. ........................... 83/698.11; 83/552; 83/690; 83/691; 83/699.51
[58] Field of Search ............................. 83/549, 552–553, 83/563, 684, 685, 687, 688, 690, 691, 694, 698.11, 698.31, 698.71, 698.91, 699.31, 699.51; 403/5, 14, 15, 31, 36, 37, 50, 179, 185

[56] References Cited

U.S. PATENT DOCUMENTS

| | | | |
|---|---|---|---|
| 1,077,668 | 11/1913 | Carlson | 83/552 |
| 2,017,247 | 10/1935 | Hodge | 83/687 X |
| 2,703,143 | 5/1955 | Good et al. | 83/685 X |
| 2,806,491 | 9/1957 | Kaley | 83/699.51 |
| 2,936,652 | 5/1960 | Gunzner | 74/527 |
| 3,234,839 | 2/1966 | Smeets | 83/549 |
| 3,760,652 | 9/1973 | Joyard et al. | 74/527 |
| 3,972,260 | 8/1976 | Hayashi et al. | 83/549 |
| 4,096,774 | 6/1978 | Kaufmann | 83/552 |
| 4,103,574 | 8/1978 | Greer | 83/685 X |
| 4,165,669 | 8/1979 | Brown et al. | 83/552 X |
| 4,541,318 | 9/1985 | Kreuzgruber | 83/552 X |
| 5,042,352 | 8/1991 | Lux | 83/690 |
| 5,048,385 | 9/1991 | Echert et al. | 83/552 X |
| 5,076,127 | 12/1991 | Otto et al. | 83/552 |
| 5,215,513 | 6/1993 | Maynard et al. | 83/552 X |
| 5,342,276 | 8/1994 | Fujiwara et al. | 83/552 X |
| 5,769,487 | 6/1998 | Michler | 403/5 X |

FOREIGN PATENT DOCUMENTS

| | | | |
|---|---|---|---|
| 1052260 | 4/1979 | Canada | 83/552 |
| 0110027 | 5/1991 | Japan | 83/684 |
| 261908 | 1/1970 | U.S.S.R. | 83/698.91 |
| 1454547 | 1/1989 | U.S.S.R. | 83/552 |

*Primary Examiner*—Rinaldi I. Rada
*Assistant Examiner*—Boyer Ashley
*Attorney, Agent, or Firm*—Armstrong, Westerman, Hattori, McLeland, & Naughton

[57] ABSTRACT

Pin insertion holes 25, and 26 are adjustable relative to each other and are arranged such that one is on a die holder 6 which is mounted on an alignment plate 7 of a lower turret 2 and the other one is on the alignment plate 7 itself. A mounting pin 11 is inserted through the die holder 6 and through both pin insertion holes 25, 26. This mounting pin 11 is capable of increasing and decreasing in diameter when inserted in the pin insertion holes 25, 26. The mounting pin 11 is charged with a pressure medium 22 such as oil or the like and this diameter increase is carried out by the pressurization of the pressure medium 22 by the screwing of a pressure application screw 23 or the like.

1 Claim, 5 Drawing Sheets

DIE HOLDER MOUNTING STRUCTURE

TECHNICAL FIELD

The present invention relates to a die holder mounting structure for a turret punch press.

BACKGROUND ART

On a conventional turret punch press, a die is arranged on the lower turret via a die holder and dies are at each die holder. The mounting of the die holder on the lower turret is carried out by the coupling of one end to a pin projecting from the lower turret and fixing the other end with a bolt.

Having a conventional arrangement as described above where the die holder is fixed by a bolt necessitates space in the inner diameter of the bolt hole and because of this, there are limits to the accuracy of the mounting of the die holder on the lower turret. As a result, core dis-alignment between the die and punch is generated and it is necessary to arrange enough clearance between the die and punch in order to be able to absorb this core dis-alignment.

However, when the clearance between the die and punch increases, the barb generated on the reverse side of the work punch hole exponentially increases and clean punch processing becomes difficult.

Apart from the accuracy of the mounting of the die holder, rigidity and heat deformation of the frame as well as core dis-alignment of the upper and lower turrets have been posited as reasons for the generation of core dis-alignment between the die and punch and in order to limit the generation of barb, it is necessary to generally improve these. However, accuracy of the mounting of the die holder is a large cause of core dis-alignment.

SUMMARY OF THE INVENTION

In order to solve the above problems, it is an object of the present invention to propose a die holder mounting structure that improves the accuracy of the mounting of the die holder.

In order to achieve the above object, the die holder mounting structure of the present invention is arranged with pin insertion holes, that are adjustable relative to each other, one of the pin holes is arranged on a die holder mounted on a lower turret and another one of the pin holes is arranged on that lower turret itself. The die holder mounting structure is also arranged with a mounting pin that is inserted from the die holder side through the pin insertion holes, and uses a device which is capable of increasing or decreasing the diameter of the mounting pin when the mounting pin is inserted in the pin insertion hole.

Accordingly, removal of the mounting pin is performed when the mounting pin is in the decreased diameter state. By increasing the diameter of the mounting pin after insertion, the mounting pin is in a pressurized state in the pin insertion hole. As a result, there is no space between the mounting pin and pin insertion hole and the die holder can be mounted with increased accuracy. Moreover, removal of the mounting pin is simple as it is removed when there is a high degree of space in the pin insertion hole.

In the aforementioned structure, the lower turret may have a turret main body and an alignment plate attached to the upper surface of the turret main body so as to be position-adjustable and upon which is loaded the die holder. In this example, the aforementioned pin insertion hole of the lower turret is arranged in the alignment plate.

Due to the adjustment of that mounting position, the alignment plate is able to adjust the core dis-alignment between the die and punch arising from the core dis-alignment of the upper and lower turrets independently for each die. Due to the insertion of a mounting pin through the alignment plate and die holder due to the diameter increase of this mounting pin, the alignment plate and die holder may be fixed in the radial direction and the die holder may be fixed in a highly accurate position horizontally with respect to the alignment plate.

Furthermore, the aforementioned mounting pin is arranged with a non-circular head, the opening of the pin insertion hole of the die holder is arranged with a counter-bore that fits with that head part and a stepped part may be arranged on that upper edge of that counter-bore and on which rests that head part by rotating the head part of the mounting pin by a predetermined angle with respect to the positioning hole for the mounting pin.

In the above structure, normally the die holder is fixed by the insertion of the mounting pin in the pin insertion hole so that the head of the mounting pin fits with the counter-bore part and whenever the die is to be exchanged, after removing the mounting pin to a raised state, the mounting pin can be held in the raised state by the head part so as to rest on the stepped part of the counter-bore slightly rotating it. As a result, by this simple arrangement of a head part, the mounting pin can be held in a raised state.

DETAILED DESCRIPTION OF THE PREFERRED EMBODIMENT

Figure 4:
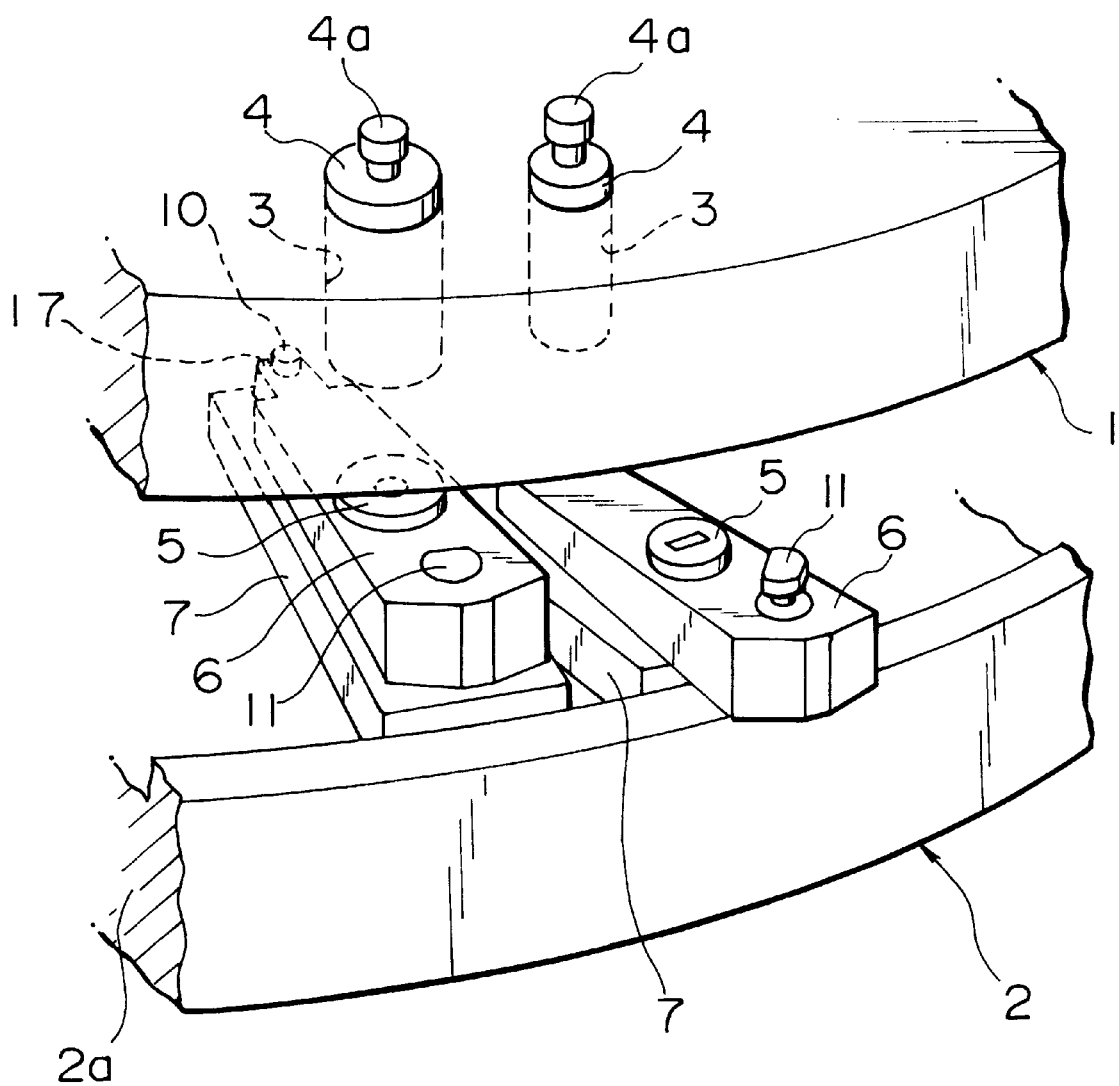
FIG. 4 is a schematic perspective view showing the turret part of a turret punch press utilizing the die holder mounting structure of the present invention.

A first embodiment of the present invention will be described based on the drawings. As shown in the schematic drawing in FIG. 4, a punch holder 4 which freely vertically moves is fitted in each punch fitting hole 3 arranged around the periphery of an upper turret 1. The punch holder 4 is a forcibly raised type incorporated in the punch (not shown in the drawing) and has a T-shaped head part coupled to a guide board (not shown in the drawing) and ram. A die holder 6 which holds either one or a plurality of die 5 (only one is shown in the drawing) is positioned on the upper surface of a lower turret 2 via an alignment plate 7. The alignment plate 7 is one part of the lower turret 2 and is mounted on the lower turret main body 2a by a plurality of bolts so that minute mounting position adjustments may be made. The inner end of the die holder 6 in the turret radial direction is fixed by an inner end fixing pin 10 and the outer end is fixed by a mounting pin 11.

As shown in FIG. 1, the plane of the die holder 6 is formed as an approximate fan shape. The die holder 6 has round die fitting holes 13, 13 that incorporate the die 5 arranged in two separate places in the turret radial direction. A hole 14 for slag ejection is arranged in the base of the die fitting hole 13. A die 5 is fitted in the die fitting hole 13, rests upon the base formed by the step around the hole 14, and is fixed in place by a stop screw (not shown in the drawings) in a screw hole bored in the side of the die holder 6. The alignment plate 7 is a plate that has a flat shape similar to the die holder 6. The alignment plate is arranged with a hole 16 continuous with the hole 14 of the die holder 6.

An inside coupling arm 17 extends from the center of the narrow end of the die holder 6, which forms the turret inner diameter side and a U-shaped notch 18 is arranged in that end. The opened end of the notch 18 is formed as a taper shape. The notch 18 fits into the shaft of the aforementioned inner end fixing pin 10 and the head 10a being larger in diameter than the inner end fixing pin 10 couples with upper surface of the inside coupling arm 17. The shaft tip of the inner end fixing pin 10 is a male screw and is held in place from the lower side by a nut passing through the alignment plate 7.

Two pin insertion holes 25, 26 which may be adjusted relative to each other are arranged with one hole being in the outer diameter side end of the die holder 6 and another hole being in the alignment plate 7 respectively. A mounting pin 11 is fitted through these pin insertion holes 25, 26. A counter-bore 27 into which fits the head 11a of the mounting pin 11 is formed in the upper surface open part of the pin insertion hole 25 of the die holder so that the plan shape that is open to the die holder outer diameter is a U-shaped notch. The base of that U-shaped counter bore 27 is formed as a vertical straight line part 27a with respect to the turret radial direction. Moreover, a step 27b comprising a shallow notch is formed along this straight line part 27a.

Figure 1A:
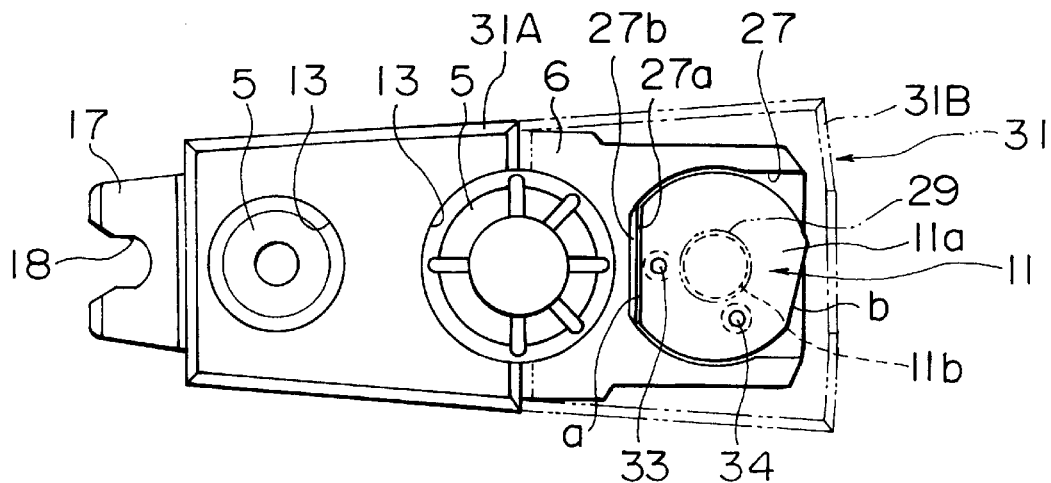
FIG. 1A is a plan view of the die holder mounting structure of a first embodiment of the present invention.
Figure 1B:
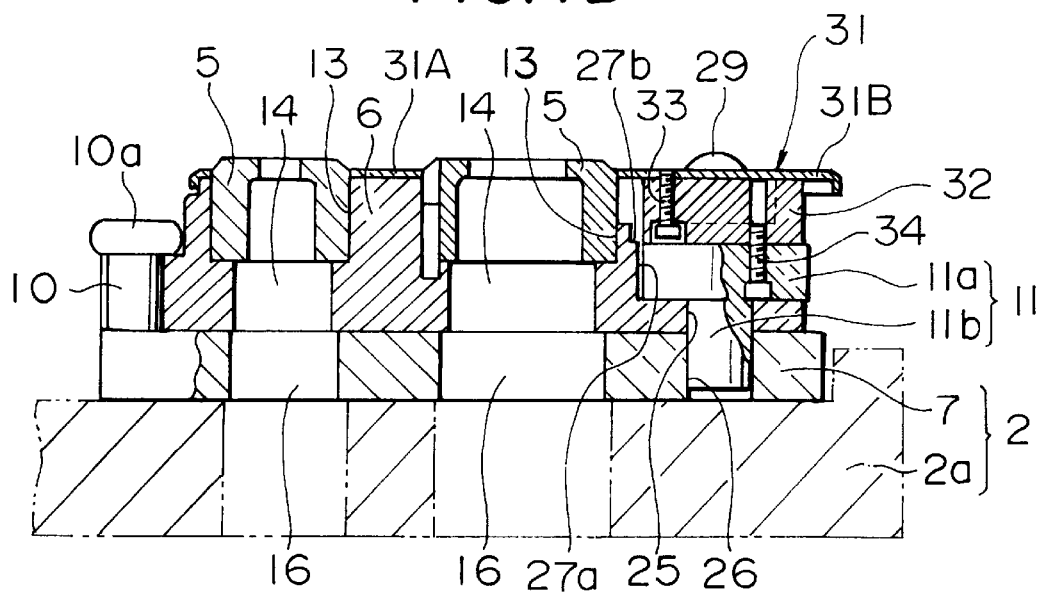
FIG. 1B is a fractured side view of the same and FIGS. 1C and 1D are an enlarged side view and enlarged plan view of the mounting pin respectively.
Figure 1C:
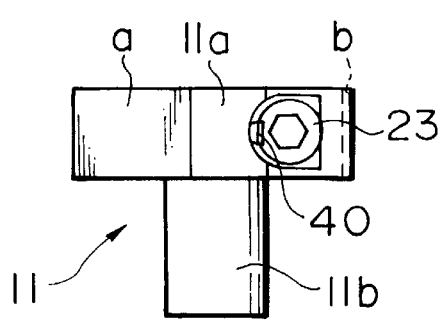
Figure 1D:
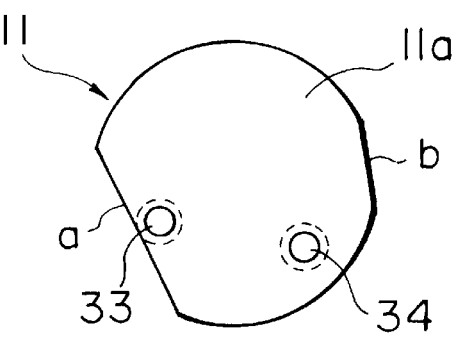

The mounting pin 11 is formed as a headed pin having a head 11a of which the periphery is wide as shown in FIGS. 1C and 1D and as described later, the shaft 11b of the mounting pin 11 is able to increase and decrease in diameter by a predetermined operation. Furthermore, the head 11a of the mounting pin 11 is formed as a non-circular shape having two cut-away parts being straight lines a, b. The aforementioned two straight lines a, b are angled away from being in a parallel state with each other by a predetermined angle. One of the straight lines a is barb with the straight line 27a on the counter-bore 27 of the die holder 6.

A table 31 for loading and guiding the work is arranged on the upper surface of the die holder 6 as a partial tables 31A and 31B divided in two in the turret radial direction. The inner diameter side partial table 31A is fixed directly to the upper surface of the die holder 6 by a bolt or the like (not shown in the drawings). The outer diameter side partial table 31B is mounted on the head 11a of the mouting pin 11 via a thick circular spacer 32. The spacer 32 is mounted on the underside of the partial table 31B by a mounting screw 33 which is inserted from the underside and moreover is mounted on the head 11a by a mounting screw 34 which passes through the head 11A from below. Furthermore, a free bearing 29 is arranged on the upper surface of the partial table 31B in a state where it is buried in the bearing case concentric with the mounting pin 11.

Figure 3A:
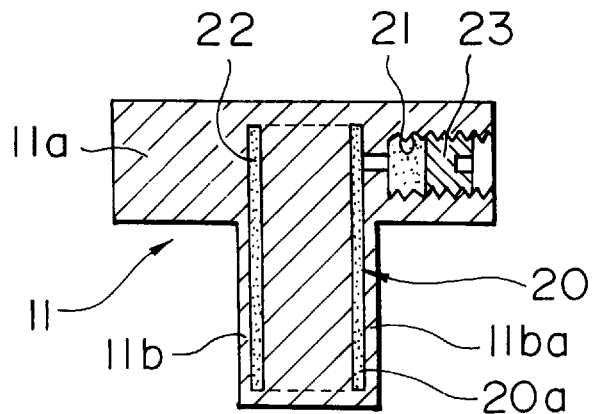
FIG. 3A is a sectional view showing a schematic drawing of the mounting pin of the die holder mounting structure of the present invention.

FIG. 3A shows a fluid type increase-decease means 20 that increases or decreases the diameter of the mounting pin 11. The shaft 11b of the mounting pin 11 comprises a cylindrical filling chamber 20a near the outer periphery as shown in the drawing and the periphery of the filling chamber 20a forms an outer sleeve 11ba. A female screw part 21 which is open to the outer diameter surface of the head 11a is arranged in the filling chamber 20a and a pressure medium 22 comprising a liquid such as oil or the like is present in the filling chamber 20a. A pressure application screw 23 is screwed into the female screw part 21 and by screwing the pressure application screw 23, the pressure medium 22 is pressurized and the sleeve 11ba is pushed out from the inner part and the shaft 11b of the mounting pin 11 is increased in diameter. When the pressure application screw 23 is loosened, the shaft 11b diameter decreases due to the elasticity of sleeve 11ba. The pressure application screw 23 is unremovable due to a stopper screw 40 (FIG. 1C) that is screwed into a screw hole arranged in the inner diameter surface of the female screw part 21.

Figure 3B:
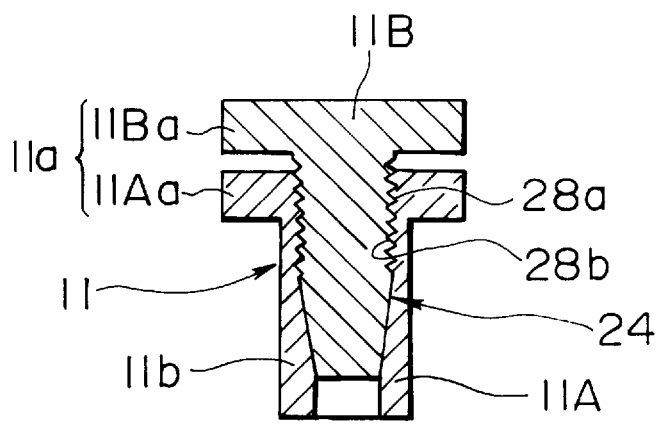
FIG. 3B is a sectional view showing a schematic drawing of another embodiment of the mounting pin and of the die holder mounting structure of the present invention and FIG. 3C is a side view of the saw.
Figure 3C:
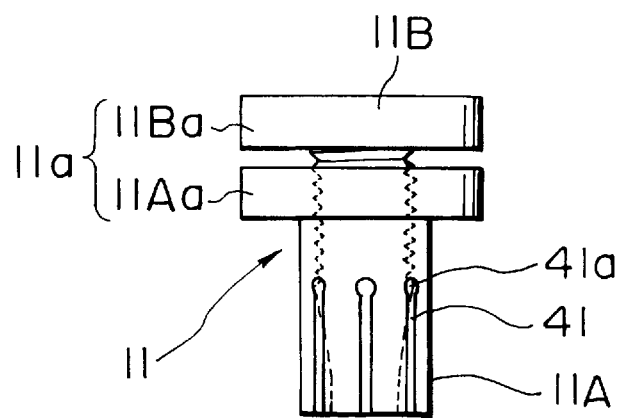

It should be noted that the mounting pin 11 may be so arranged that the shaft 11b is increased and decreased in diameter by a mechanical increase-decrease means 24 as shown in FIG. 3B. The increase-decrease means 24 of the same drawing comprises a mounting pin 11 of 2 members including a sleeve 11A and a core member 11B, both with a head attached. The sleeve 11A has a cross-sectional taper shape so that the inner diameter surface becomes smaller in diameter towards the tip. The core member 11B is has a tapered pin shape that fits with the inner diameter surface of the sleeve 11A. Moreover, the core member 11B comprises a screw 28a close to the basal end and screws into the female screw 28b in the base of the sleeve 11A. Expanding slots 41 extending in the axial direction from the tip to the head area are arranged in a plurality of places in the peripheral direction in the sleeve 11A. Approximately circular spreading parts 41a are arranged in the upper end of the expanding slots 41. Heads 11Aa,11Ba of the sleeve 11A and core member 11B, respectively are both non-circular and may be rotated relative to each other by a tool.

When this mounting pin 11 is used, the sleeve 11A is pushed outwards from the inner surface by the screwing of the core member 11B into the sleeve 11A thus increasing the diameter of the shaft 11b. Furthermore, when the screwed state of the core member 11B is loosened with respect to the sleeve 11A, the sleeve 11A reverts to the original diameter due to its elasticity and decreases in diameter. It should be noted that the sleeve 11A easily increases in diameter due to the formation of the expanding slots 41. Furthermore, as spreading parts 41a are formed in the upper end of the expanding slots 41, cracks from the top end of the expanding slots 41 where stress easily concentrates are prevented even after repeated diameter increases and decreases.

Next, the die exchange operation on the above described die holder mounting structure will be described. When the die 5 is to be exchanged, the die holder 6 is removed from the alignment plate 7 of the lower turret 2 and exchanged for a die 5 from a die holder 6 on a separate device. The die holder 6 with the exchanged die 5 is then re-attached to the alignment plate 7 of the lower turret 2. When this attachment is carried out, the die holder 6 couples the U-shaped notch 18 to the inner end fixing pin 10 of the alignment plate 7 and after this, the mounting pin 11 is inserted through the die holder 6 and the pin insertion holes 25, 26 of the alignment plate 7.

After insertion into the pin insertion holes 25, 26, the shaft 11b of the mounting pin 11 is expanded by screwing the pressure application screw 23. Accordingly, the shaft 11b exerts pressure on the inner diameter surface of the pin insertion holes 25, 26 of the die holder 6 and alignment plate 7, is strongly fixed to the die holder 6 and alignment plate 7 and ensures immobility in the axial direction. Furthermore, as the mounting pin 11 is increased in diameter and is pressurized, the accuracy of the positioning of the die holder 6 with respect to the alignment plate 7 is high and core dis-alignment between the die 5 and punch is reduced. As a result, the clearance between the die 5 and the punch can be reduced, the barb of the punch processed products reduced and the quality of products improved. As insertion and removal of the mounting pin 11 with respect to the pin insertion holes 25, 26 is carried out with the mounting pin 11 in the diameter decreased state, a large amount of space is generated in the inner part of the pin insertion holes 25, 26 and removal is simplified. This die holder mounting structure enables simple and quick attachment and removal of the die holder 6 and moreover, ensures improved accuracy.

Figure 2A:
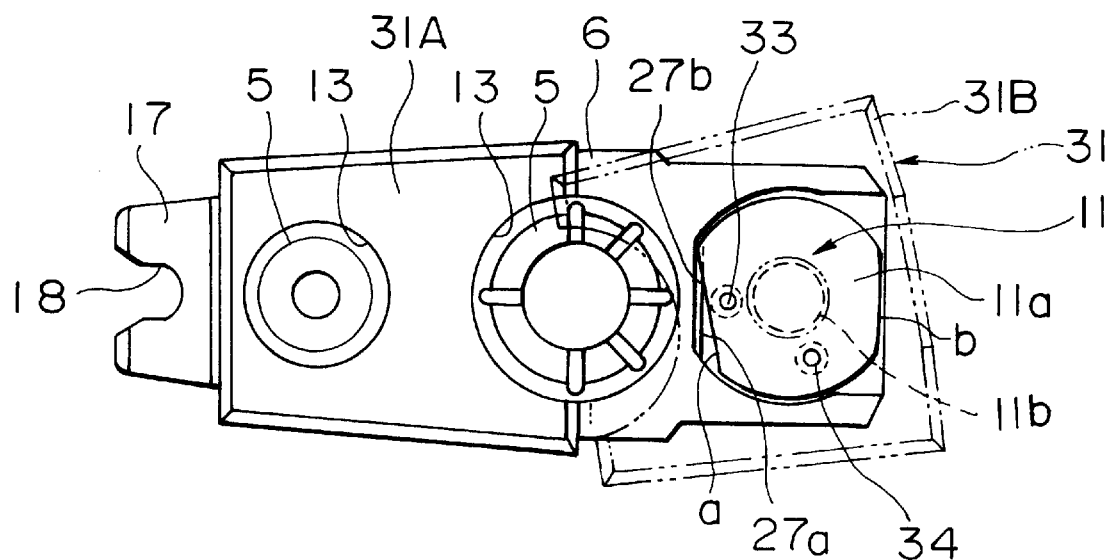
FIG. 2A is a plan view of the mounting pin of the die holder mounting structure of the present invention in the raised held state and FIG. 2B is a sectional view showing the dis-alignment in the axis of rotation between the die holder and alignment plate.
Figure 2B:
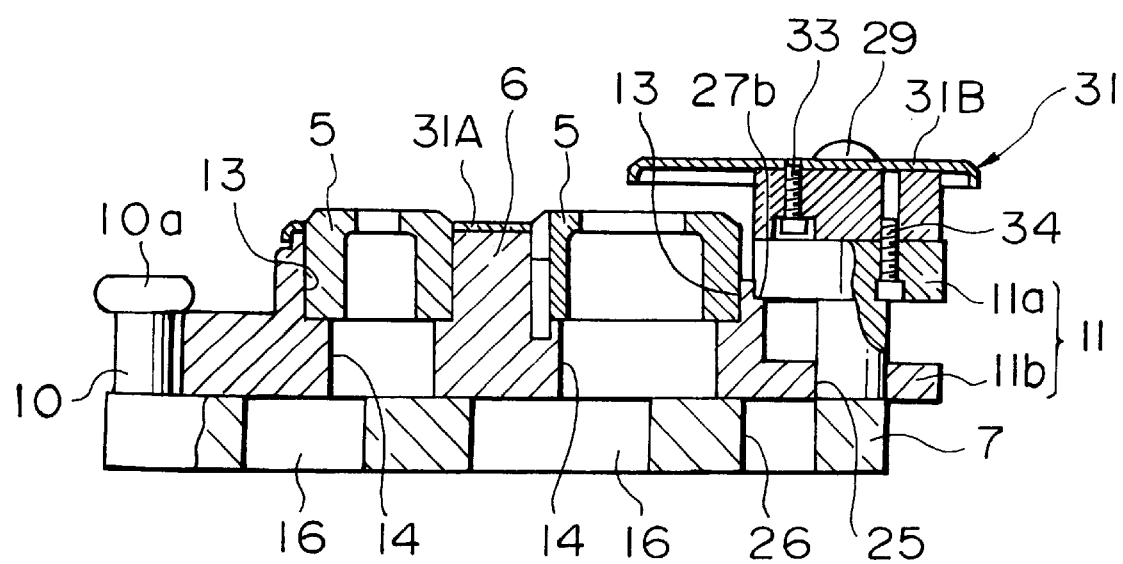

Furthermore, (as seen in FIGS. 2A and 2B) when the die holder is to be removed, the mounting pin 11 is simply removed from the pin insertion hole 26 of the alignment plate 7 and left in a raised state while still inserted in the pin insertion hole 25 of the die holder 6. In this case, by rotating slightly the partially removed mounting pin 11, one side of the straight line a on the head 11a of the mounting pin 11 can be rested on the step 27b of the counter bore 27 and the raised state of the mounting pin 11 can be maintained. Due to this, when exchanging the die, the mounting pin 11 can be carried together with the die holder 6 and this eliminates the trouble of storing the mounting pin 11 in a separate place. Moreover, the maintenance of this raised state of the mounting pin 11 is easily achieved by a simple structure comprising only the step 27b. The angle of rotation of the mounting pin 11 when the head 11a of the mounting pin 11 is rested on the step 27b may be an angle such that the straight line b of the head 11a is in alignment with the outer diameter side edge surface of the die holder 6 (see FIG. 2A). In short, the straight line b of the head 11a may be used as a mark for aligning the angle of rotation. As a result, the mounting pin 11 may be easily rotated by the predetermined angle.

Figure 5:
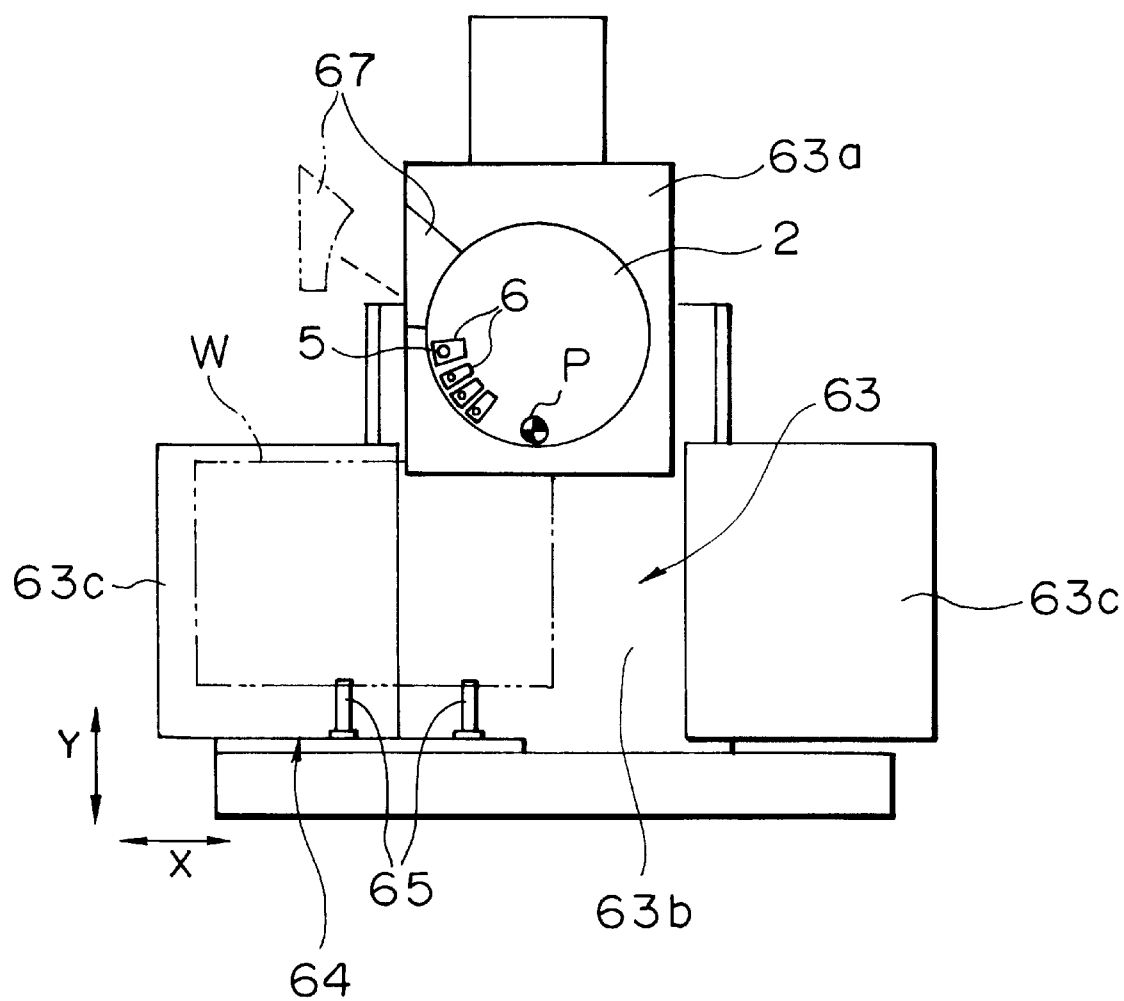
FIG. 5 is a fractured plan view showing the schematic structure of a turret punch press.

FIG. 5 is a schematic plan view of a turret punch press utilizing this die holder mounting structure. A table 63 is arranged around the periphery of the lower turret 2 and a work W is enclosed by a work holder 65 of the work delivery device 64 ontop of that and is moved in the X and Y axes. The table 63 comprises a table 63a fixed around the periphery of the turret, a centrally fixed table 63b and a slide table 63c that moves along the Y axis. The table 63a fixed around the periphery of the turret partially comprises a removable table 67 and die 5 exchange is carried out at the place where this is removed.

As the die holder mounting structure of the present invention is so arranged that the die holder may be fixed to the lower turret by a mounting pin and the diameter of this mounting pin may be increased or decreased while inserted in the pin insertion hole, the accuracy of the mounting of the die holder is improved and the die holder is fixed firmly. Improvements in the accuracy of the mounting reduce the clearance between the punch and die, reduce the barb of the punched products and improve the product quality.

Furthermore, when an alignment plate is arranged on the lower turret and a pin insertion hole is arranged in that alignment plate, the die holder may be firmly held in the axial direction with respect to the alignment plate and held with increased accuracy in the horizontal direction.

Yet further, when a non-circular head is arranged on the mounting pin, a counter bore that fits with that head is arranged on the open end of the pin insertion hole of the die holder and a step part on which that head is rested by rotating by a predetermined angle with respect to the positioning hole of the mounting pin is arranged on the upper edge of that counter bore, the mounting pin may be maintained in raised state by a simple structure when a die exchange is to be carried out and a simplification of the die exchange is achieved.

What is claimed is:

1. A die holder mounting structure comprising:

a die holder holding a die for punch pressing, said die holder having a first pin insertion hole;

upper and lower turrets cooperating with each other to punch press the die, said die holder resting on said lower turret, said lower turret having a second pin insertion hole over which the first pin insertion hole is aligned; and a mounting pin inserted into the first and second pin insertion holes, said mounting pin having a head with an exposed pressure application screw, an expandable shaft, and a cylindrical fluid-filled chamber extending from the head into the shaft, the expandable shaft being increased and decreased in diameter by a pressure of the chamber controlled by the pressure application screw.

* * * * *